(12) United States Patent
Coulter et al.

(10) Patent No.: US 7,831,782 B1
(45) Date of Patent: Nov. 9, 2010

(54) ROLL-BACK LOG TO PROVIDE DATA CONSISTENCY

(75) Inventors: Timothy R. Coulter, Morgan Hill, CA (US); Raghu Krishnamurthy, Santa Clara, CA (US); Par A. Botes, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 664 days.

(21) Appl. No.: 10/881,724

(22) Filed: Jun. 30, 2004

(51) Int. Cl.
G06F 12/00 (2006.01)
G06F 13/00 (2006.01)
G06F 13/28 (2006.01)

(52) U.S. Cl. .................. 711/159; 711/E12.036

(58) Field of Classification Search .............. 711/161, 711/162, 159, E12.036
See application file for complete search history.

(56) References Cited

U.S. PATENT DOCUMENTS

| | | | |
|---|---|---|---|
| 5,487,160 A | 1/1996 | Bemis | 711/114 |
| 5,535,381 A | 7/1996 | Kopper | 710/52 |
| 5,835,953 A * | 11/1998 | Ohran | 711/162 |
| 6,158,019 A | 12/2000 | Squibb | 714/13 |
| 6,161,219 A * | 12/2000 | Ramkumar et al. | 717/130 |
| 6,691,245 B1 * | 2/2004 | DeKoning | 714/6 |
| 6,732,293 B1 | 5/2004 | Schneider | 714/15 |
| 6,839,819 B2 * | 1/2005 | Martin | 711/162 |
| 6,898,688 B2 | 5/2005 | Martin et al. | 711/202 |
| 6,911,983 B2 * | 6/2005 | Sabella et al. | 345/536 |
| 6,983,352 B2 * | 1/2006 | Keohane et al. | 711/162 |
| 7,085,900 B2 | 8/2006 | Inagaki et al. | 711/162 |
| 7,257,606 B2 | 8/2007 | Kapoor et al. | 707/205 |
| 2002/0112134 A1 * | 8/2002 | Ohran et al. | 711/162 |
| 2002/0129047 A1 | 9/2002 | Cane et al. | 707/204 |
| 2003/0005235 A1 | 1/2003 | Young | 711/141 |
| 2003/0115431 A1 | 6/2003 | Hubbard et al. | 711/162 |
| 2003/0140070 A1 * | 7/2003 | Kaczmarski et al. | 707/204 |
| 2004/0034752 A1 | 2/2004 | Ohran | 711/161 |
| 2004/0073831 A1 * | 4/2004 | Yanai et al. | 714/7 |
| 2005/0027956 A1 | 2/2005 | Tormasov et al. | 711/162 |
| 2005/0076262 A1 | 4/2005 | Rowan et al. | 714/6 |
| 2005/0076264 A1 | 4/2005 | Rowan et al. | 714/6 |
| 2006/0174074 A1 | 8/2006 | Banikazemi et al. | 711/162 |
| 2007/0250663 A1 | 12/2007 | Welsh et al. | 711/117 |

FOREIGN PATENT DOCUMENTS

WO WO 02/059749 A1 8/2002

OTHER PUBLICATIONS

Tanenbaum, Andrew, "Structured Computer Organization," Prentice Hall, 1984, pp. 10-12.

* cited by examiner

Primary Examiner—Sheng-Jen Tsai
(74) Attorney, Agent, or Firm—Campbell Stephenson LLP (57) ABSTRACT

A system or method for reestablishing data consistency between data volume P and its real time or near real time copy volume S. When volumes P and S enter a state of data inconsistency, data consistency can be restored through use of roll-back and/or roll-forward logs. The roll-forward log stores new data to be written to volume P. The roll-back log stores existing data of volume S before the existing data of volume S is overwritten with new data. As will be more fully described below, the roll-back log can be used to incrementally restore volume S to a prior data state in reverse chronological order, while a roll-forward log can be used to incrementally restore volume S in forward chronological to equal the data state of volume P.

11 Claims, 9 Drawing Sheets

FIG. 8D

ROLL-BACK LOG TO PROVIDE DATA CONSISTENCY

BACKGROUND OF THE INVENTION

Large business enterprises nearly always employ multiple data centers since customer, supply chain, and internal user response requirements make it most efficient to store on-line data close to where it is used. Inevitably, this means that the same data must be available at several widely separated locations. Price lists, product specifications, web pages, and similar data must often be replicated at several of the enterprise's operating locations.

It is important that such data be consistent throughout the enterprise. If data is to be consistent, it must be replicated to remote locations where it is used. Changes to all data replicas must be synchronized so that they appear at all locations at approximately the same time. Perhaps one of the most important reasons for data replication is disaster recovery. Enterprises need strategies for recovering their ability to process data soon after an event, such as a software failure or a hardware failure, incapacitates an entire data center or the data in it. An up-to-date replica of the operational data at a remote location unaffected by the failure causing event can mean the difference between rapid recovery and total enterprise failure.

Ideally, mirroring data would fulfill the business needs met by data replication technology. Two facts relating to distributed data centers make mirroring inadequate. More particularly, distances between primary and secondary data centers, routing hops, and momentary network overloads can make data update transmission time too long in terms of its affect on application response. Additionally, brief network outages can occur frequently enough to make the frequent mirror resynchronization they would imply unacceptable.

However, data transfer technology has advanced so that the distances between primary and secondary data centers having mirrored data, can be stretched without concerns of momentary network overloads. For instance, data centers can be separated by up to 100 kilometers using dense wave division multiplexing in the data link therebetween. Unfortunately, failures of the data link between data centers still require mirror resynchronization.

Mirror resynchronization can be a lengthy process that oftentimes requires a full resynchronization in which data is copied from one minor to the other in a block by block process until all data blocks of the minor have been copied.

SUMMARY OF THE INVENTION

A system or method for reestablishing data consistency between data volume P and its real time or near real time copy volume S. When volumes P and S enter a state of data inconsistency, data consistency can be restored through use of roll-back and/or roll-forward logs. The roll-forward log stores new data to be written to volume P. The roll-back log stores existing data of volume S before the existing data of volume S is overwritten with new data. As will be more fully described below, the roll-back log can be used to incrementally restore volume S to a prior data state in reverse chronological order, while a roll-forward log can be used to incrementally restore volume S in forward chronological to equal the data state of volume P.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

This invention relates to a system or method for maintaining data consistency between data volume P and its real time or near real time copy volume S. For purposes of explanation, the present invention will be described with respect to maintaining data consistency on the volume level, it being understood that the present invention may be applied to maintaining data consistency on the file system or database level.

Volume S may take form in a replica of volume P, or volume S may take form in a mirror of volume P. When volumes P and S enter a state of data inconsistency as a result of, for example, a failure of a data link between respective data centers containing the volumes, data consistency can be restored through use of roll-back and/or roll-forward logs. As will be more fully described below, a roll-back log can be used to incrementally restore volume P or volume S to a prior data state in reverse chronological order, while a roll-forward log can be used to incrementally restore one of the volumes P or S in forward chronological order to the data state of the other of the data volumes. While the present invention will be described with reference to maintaining data consistency between a single volume and its mirror or replica, the present invention could also be used for maintaining data consistency between several data volumes and their mirrors or replicas.

Figure 1:
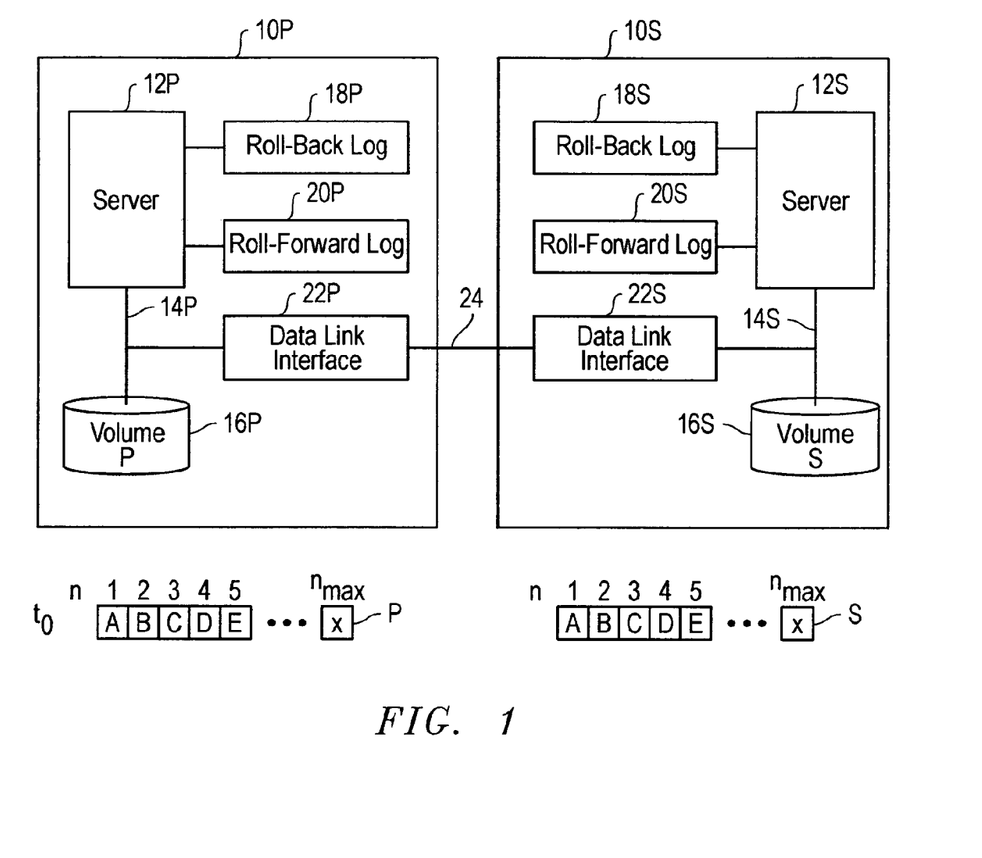
FIG. 1 shows a block diagram of relevant components in a data processing system employing one embodiment of the present invention and a graphical representation of volume P and its real time or near real time copy volume S.

The present invention will be described with reference to data volumes P and S stored at separate and remotely located data centers, it being understood that the present invention should not be limited thereto. In another embodiment, the present invention may be applied to volumes P and S stored in the same data center. FIG. 1 illustrates in block diagram form, relevant components of exemplary data centers. More particularly, FIG. 1 shows a primary data center 10P and a secondary data center 10S coupled together via a data link 24. Primary data center P includes a computer system 12P coupled directly or indirectly to a memory system 16P that stores data volume P. Secondary data center 10S also includes a computer system 12S coupled directly or indirectly to a memory system 16S that stores volume S. Computer systems 12P and 12S can be any computer or other data processing device. For example, computer systems 12P and 12S can be conventional personal computers, servers, special purpose computers, or the like. For purposes of explanation, computer systems 12P and 12 S are presumed to take form in servers each having one or more processors for executing instructions. The present invention can be implemented by server 12P executing instructions stored in memory (not shown), by server 12S executing instructions stored in memory (not shown), or by a combination of servers 12P and 12S executing instructions stored in memory.

Servers 12P and 12S are coupled to client computer systems (not show). Servers 12P and/or 12S may receive transaction requests directly or indirectly from the client computer systems. Each of the server 12P and 12 S execute an application that generates transactions that directly or indirectly read data from or write data to volumes P and S, respectively, in response to receiving and processing transaction requests from the client computer systems. In one embodiment, server 12P is designated as the primary server for processing transaction requests from client computer systems, and server 12S is provided for disaster recovery purposes. In this embodiment, volume S may take form as a replica of volume P with server 12S standing ready to receive and process transaction requests from the client computer systems using replica S in the event data center 12P is rendered unusable by, for example, failure of server 12P. More particularly, if server 12P fails as a result of, for example, hardware failure, transaction requests from client computer systems are redirected to data center 10S for processing. In another embodiment, servers 12P and 12S are clustered together through use of well known clustering software (not shown) even though servers 12P and 12S may be remotely located from each other through use of a network transport protocol such as dense wave division multiplexing. In this alternative embodiment, volumes P and S are maintained as mirrors. Server 12P accesses volume P in response to receiving and processing transaction requests from client computer systems, while server 12S accesses volume S in response to receiving separate transactions from other client computer systems. In either embodiment, it is essential to maintain volume S as a real or near real time copy of volume P. In other words, it is essential to maintain data consistency between volumes P and S.

A write data transaction is completed in data center 10P or 10S after overwriting existing data in one or more data blocks of volume P or V with new data. For ease of explanation only, it will be presumed that each write transaction overwrites all existing data in a single block n with new data, it being understood that the present invention should not be limited thereto. After a write transaction completes very little difference may exist between the existing data and new data. Any modification to data in volume P as a result of completing a write transaction should be reflected in volume S in order to maintain volume S as a real or near real time copy of volume P. In other words, existing data in block n of volume S should be overwritten with a copy of the new data before or after existing data in block n of volume P is overwritten with the new data in order to maintain data consistency between volume P and volume S. Likewise, any modification to data in volume S as a result of completing a write transaction should be reflected in volume P.

Transaction requests to read or write data are transmitted directly or indirectly to memory systems 16P or 16S. Server 12P communicates directly or indirectly with memory system 16P via communication link 14P. Similarly, server 12S communicates directly or indirectly with memory system 16S via communication link 14S. Communication links 14P and 14S may take form in storage area networks (SAN's) each having one or more components such as switches, hubs, routers (not shown), coupled, etc. Each of the data centers 10P and 10S may include additional components (e.g., a data base management system, a file system, a volume manager, etc.) in data communication with each other, even though the additional components are not shown within FIG. 1.

Each of the memory systems 16P and 16S may take form in one or more disk arrays or other storage devices, it being understood that the term memory system should not be limited thereto. For purposes of explanation, it will be presumed that each of memory systems 16P and 16S takes form in a single disk array that stores data volumes P and volume S, respectively. FIG. 1 illustrates graphical representations of volumes P and S. As noted above, volume S is a real time or near real time copy of volume P. Accordingly, volume P and its volume S are abstractions each consisting of $n_{max}$ data blocks that store or are configured to store identical data, respectively. While it may be said that data blocks of volume P and volume S store data, in reality, data is stored within physical memory blocks within disk arrays 16P and 16S, respectively. The first five data blocks designated 1-5 of volume P and volume S in FIG. 1 are shown storing data designated A-E, respectively, at an initial time $t_0$. At time $t_0$, the data contents of volume P are presumed identical to the data contents of volume S.

Data center P includes memory devices 18P and 20P coupled to and accessible by server 12P. Similarly, data center S includes memory devices 18S and 20S coupled to and accessible by server 12S. For purposes of explanation, each of these memory devices will take form in random access memory (RAM), it being understood that the present invention should not be limited thereto. In one embodiment, memory devices 18P and 20P are contained in server 12P, while memory devices 18S and 20S are contained in server 12S. Memory devices 18S and 18P are designated as roll-back logs while memory devices 20S and 20P are designated as roll-forward logs. Roll-back logs 18S and 18P store or are configured to store existing data copied from volumes S and P, respectively, before the existing data is overwritten with new data. The roll-forward logs 20S and 20P store or are configured to store copies of the new data. In one embodiment, roll-forward logs 18P and/or 18S may take form in storage replication logs (SRL). SRLs are typically used in systems for replicating data volumes.

Before or after data is copied to roll-back logs 18S and 18P or roll-forward logs 20S and 20P, in one embodiment, the data may be compressed according to any one of many well-known compression algorithms. Such compression would reduce the amount of storage space within logs 18S, 18P, 20S and 20P needed to store data. For purposes of explanation, it will be presumed that data is stored in logs 18S, 18P, 20S and 20P in compressed format. Thus, before data can be read out and used from these logs, the data must decompressed.

Except were noted, before existing data in any block of volume P is overwritten with new data of a write transaction generated by server 12P, the existing data is copied to roll-back log 18P. The new data is copied to roll-forward log 20P either before the existing data is overwritten or after the existing data is overwritten. Further, a copy of the new data is transmitted to data center 10S so that corresponding data in volume S can be overwritten with the new data. Likewise, before existing data in any block of volume S is overwritten with new data of a write transaction generated by server 12S, the existing data is copied to roll-back log 18S except were noted. The new data is copied to a roll-forward log 20S either before or after existing data in volume S is overwritten. Further, a copy of the new data is transmitted to data center 10P so that corresponding existing data in volume P can be overwritten with the new data.

Figure 2A:
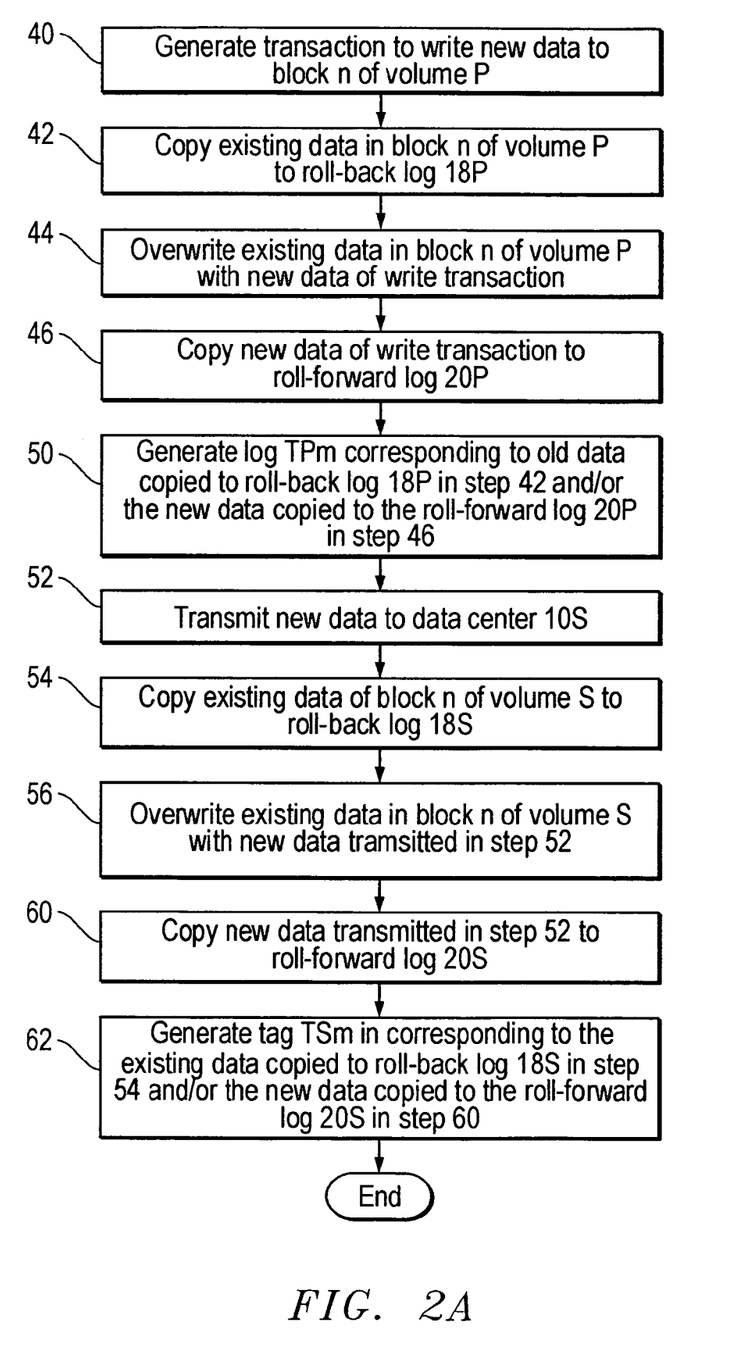
FIGS. 2a and 2b illustrate relevant aspects of writing data to roll-back and roll-forward logs of the data centers in FIG. 1 in accordance with one embodiment of the present invention.
Figure 2B:
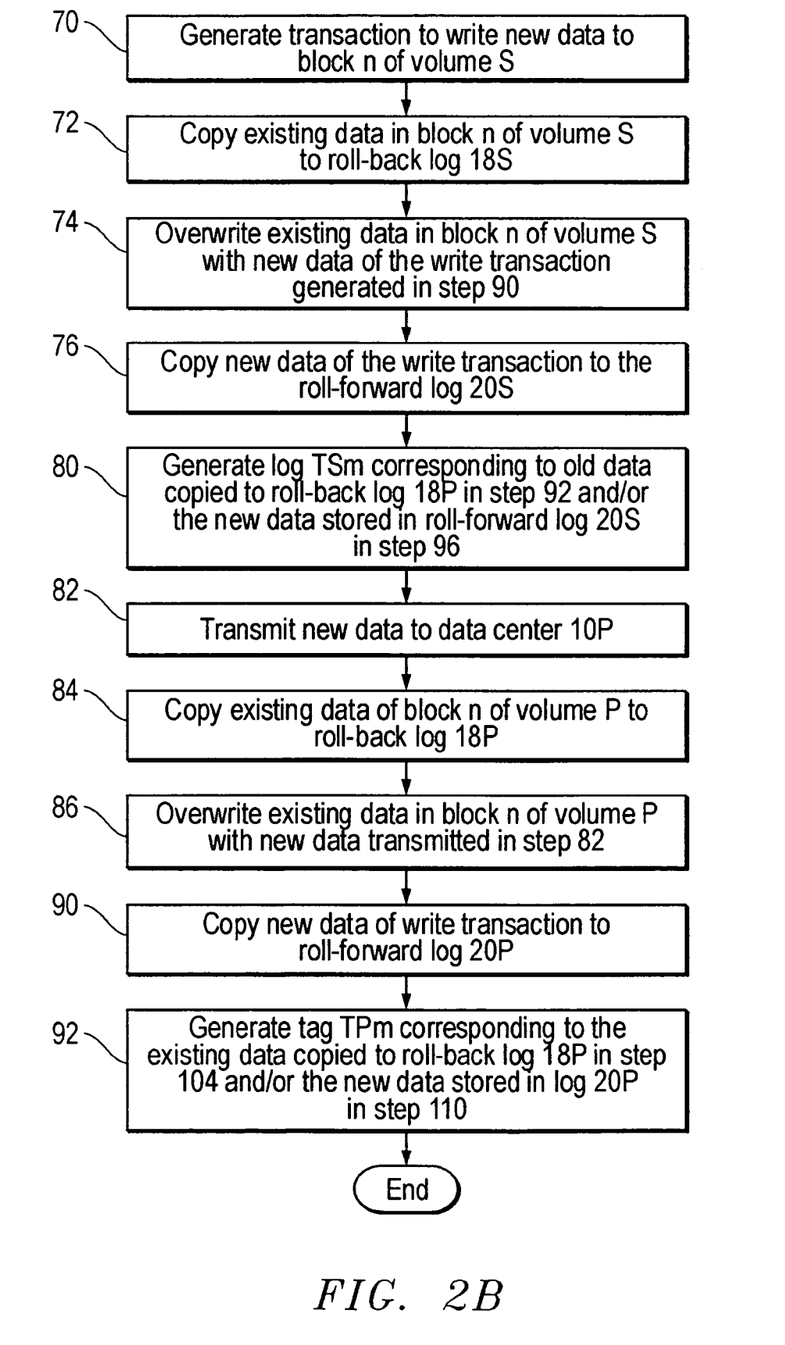

FIGS. 2a and 2b describe in greater detail the process performed by server 12P and/or server 12S in response to generation of a write transaction for overwriting existing data in block n of volume P or S with new data. The process in FIG. 2a begins with step 40 when server 12P generates a transaction to write new data to block n of volume P. In step 42, existing data of block n is copied to roll-back log 18P. Thereafter, in step 44, the existing data in block n of volume P is overwritten with the new data of the write transaction generated in step 40. A copy of the new data is stored in roll-forward log 20P in step 46. It is noted that step 46 may occur before steps 42 and/or 44. The application executing on server 12P may access data volume P while existing data within volume P is copied to roll-back log 18 or while new data is copied to roll-forward log 20P.

In step 50, server 12P generates a tag TPm corresponding to the existing data copied to roll-back log 18P in step 42, and/or the new data copied to the roll-forward log 20P in step 46. A new tag TPm is generated each time data is copied to logs 18P and/or 20P. The tag number m is generated sequentially so that sequentially generated tags have sequential tag numbers. The tag TPm may include a time stamp. For purposes of explanation, the time stamp identifies the time when in block n of volume P is overwritten with the new data in step 44, it being understood that the time stamp may represent another event of the process shown in FIG. 2a or an event associated with the write transaction generated in step 40. Tag TPm will also be described as including an identification of the data block (i.e., block n) in volume P that is the target of the corresponding write transaction generated in step 40.

In an embodiment where more than one data volume is accessed by the application executing on server 12P, tag TPm may include an identification of the volume that contains the target block of the corresponding write transaction. In another embodiment where more than one data block is the target of the corresponding write transaction, tag TPm may include an identification of the first data block and a number of consecutive data blocks following the first data block where the new data is to be written. In yet another embodiment where only a portion of the existing data in a data block is the target of the corresponding write transaction, tag TPm may include an identification of the data block, an offset from the beginning of the data block, and a data length of the new data to be written therein. Tag TPm may also include information (e.g., a flag set to binary 1 or 0) indicating that data has or has not been stored within roll-back log 18P and/or roll-forward log 20P in compressed format. It is noted that other information may be included with the tags.

Tag TPm may be stored with existing data copied to roll-back log 18P, with new data copied to roll-forward log 20P, or with both. The present invention will be described with tag TPm stored with both the existing data and new data copied to the roll-back log 18P and roll-forward log 20P, respectively. In the alternative, tag TPm may be stored in a separate tag table. Each tag TPm, however, is associated with a respective block of existing data stored in roll-back log 18P and/or a respective block of new data stored in roll-forward log 20P.

To maintain volume S in data consistency with volume P, existing data in block n in volume S should also be overwritten with the new data. For this reason, the new data is transmitted to data center 10S via data link 24 and data link interfaces 22P and 22S as shown in step 52 in FIG. 2a. The new data may be transmitted along with its correspondingly generated tag TPm. However, for purposes of explanation, it will be presumed that the new data is transmitted to data center 10S along with an identity of the target (e.g., block n) where the new data is to be written.

To maintain data consistency between volume P and volume S, the new data transmitted to data center 10S in step 52 must overwrite existing data in volume S. Before this overwrite occurs the existing data contained within block n of volume S is copied to roll-back log 18S in step 54. In step 56, the existing data in block n of volume S is then overwritten with the new data $D_{new}$. New data is also copied to the roll-forward log 20S in step 60. It is noted that step 60 may occur before step 54 and/or step 56.

Lastly, server 12S generates tag TSm in step 62. Tag TSm corresponds to the existing data copied to roll-back log 18S in step 54, and/or the new data copied to the roll-forward log 20P in step 46. The tag TSm may include a time stamp. For purposes of explanation, the time stamp of tag TSm identifies the time when existing data in block n of volume S is overwritten with the new data in step 56, it being understood that the time stamp may represent another event of the process shown in FIG. 2a or an event associated with the write transaction generated in step 40. Tag TSm will also be described as including an identification of the data block (i.e., block n) in volume S that is the target of the overwrite operation in step 56. Tag TSm may also include information (e.g., a flag set to binary 1 or 0) indicating that data has or has not been stored within roll-back log 18S and/or roll-forward log 20S in compressed format. It is noted that other information may be included with the tags. In the alternative embodiment where tag TPm is transmitted along with new data in step 52, tag TSm may simply be a copy of tag TPm.

Tag TSm may be stored with the existing data copied to roll-back log 18S, with the new data copied to roll-forward log 20S, or with both. In the alternative, tag TSm may be stored in a separate tag table. Each tag TSm, however, is associated with a respective block of existing data copied to roll-back log 18S and/or a respective block of new data stored in roll-forward log 20S.

The process in FIG. 2b is very similar to the process shown in FIG. 2a. The process of FIG. 2b is employed in the embodiment where servers 12P and 12S are clustered. The process of FIG. 2b begins with step 70 when server 12S generates a transaction to write new data to block n of volume S. In step 72, existing data of block n is copied to roll-back log 18S. Thereafter, in step 74, the existing data in block n of volume S is overwritten with the new data of the write transaction generated in step 70. A copy of the new data is stored in roll-forward log 20S as shown in step 76. It is noted that step 76 may occur before steps 72 and/or 74. The application executing on server 12S may access data volume S while existing data within volume S is copied to roll-back log 18S or while new data is copied to roll-forward log 20S.

In step 80, server 12S generates a tag TSm corresponding to the existing data copied to roll-back log 18S in step 72, and/or the new data copied to the roll-forward log 20S in step 76. A new tag TSm is generated each time data is copied to logs 18S and/or 20S. The tag number m is generated sequentially so that sequentially generated tags have sequential tag numbers. The tag TSm generated in step 80 may include a time stamp. For purposes of explanation, this time stamp identifies the time when the existing data in block n of volume S is overwritten with the new data in step 74, it being understood that the time stamp may represent another event of the process shown in FIG. 2b or an event associated with the write transaction generated in step 70. Tag TSm will also be described as including an identification of the data block (i.e., block n) in volume S that is the target of the corresponding write transaction generated in step 70.

In an embodiment where more than one data volume is accessed by the application executing on server 12S, tag TSm generated in step 80 may include an identification of the volume that contains the target block of the corresponding write transaction. In another embodiment where more than one data block is the target of the corresponding write transaction, tag TSm generated in step 80 may include an identification of the first data block and a number of consecutive data blocks following the first data block where the new data is to be written. In yet another embodiment where only a portion of the existing data in a data block is the target of the corresponding write transaction generated in step 70, tag TSm generated in step 80 may include an identification of the data block, an offset from the beginning of the data block, and a data length of the new data to be written therein. Tag TSm generated in step 80 may also include information (e.g., a flag set to binary 1 or 0) indicating that data has or has not been stored within roll-back log 18S and/or roll-forward log 20S in compressed format. It is noted that other information may be included with the tags.

Tag TSm generated in step 80 may be stored with existing data copied to roll-back log 18S in step 72, with new data copied to roll-forward log 20S in step 76, or with both. The present invention will be described with tag TSm stored with both the existing data and new data copied to the roll-back log 18S in step 72 and roll-forward log 20S in step 76, respectively. Each tag TSm generated in step 80, however, is associated with a respective block of existing data stored in roll-back log 18S and/or a respective block of new data stored in roll-forward log 20S.

To maintain volume P in data consistency with volume S, existing data in block n in volume P should also be overwritten with the new data of the write transaction of step 70. For this reason, the new data is transmitted to data center 10P via data link 24 and data link interfaces 22P and 22S as shown in step 82 in FIG. 2b. The new data may be transmitted along with its correspondingly generated tag TSm. However, for purposes of explanation, it will be presumed that the new data is transmitted to data center 10P along with an identity of the target (e.g., block n) where the new data is to be written.

To maintain data consistency between volume P and volume S, the new data transmitted to data center 10P in step 82 must overwrite existing data in volume P. Before this overwrite occurs the existing data contained within block n of volume P is copied to roll-back log 18P in step 84. In step 86, the existing data in block n of volume P is then overwritten with the new data. The new data is also copied to the roll-forward log 20P in step 90. It is noted that step 90 may occur before step 84 and/or step 86.

Lastly, server 12P generates tag TPm in step 92. Tag TSm generated in step 92 corresponds to the existing data copied to roll-back log 18P in step 84, and/or the new data copied to the roll-forward log 20P in step 86. The tag TPm generated in step 92 includes a time stamp. For purposes of explanation, the time stamp of tag TSm identifies the time when existing data in block n of volume P is overwritten with the new data in step 86. Tag TPm will also be described as including an identification of the data block (i.e., block n) in volume P that is the target of the overwrite operation in step 86. Tag TSm generated in step 92 may also include information (e.g., a flag set to binary 1 or 0) indicating that data has or has not been stored within roll-back log 18P and/or roll-forward log 20P in compressed format. It is noted that other information may be included with the tags generated in step 92.

Tag TPm generated in step 92 may be stored with the existing data copied to roll-back log 18P in step 84, with the new data copied to roll-forward log 20P in step 90, or with both. Each tag TPm, however, is associated with a respective block of existing data copied to roll-back log 18P and/or a respective block of new data stored in roll-forward log 20P.

Figure 3A:
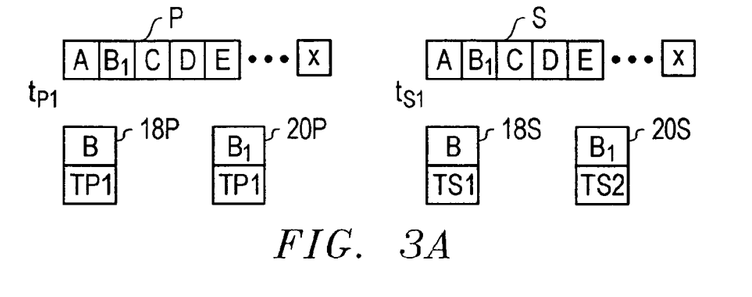
FIGS. 3a and 3b illustrate the data state of data volume P, volume S, the roll-back logs, and roll-forward logs after performing the process steps shown in FIG. 2a and prior to failure of the data link between the data centers of FIG. 1.
Figure 3B:
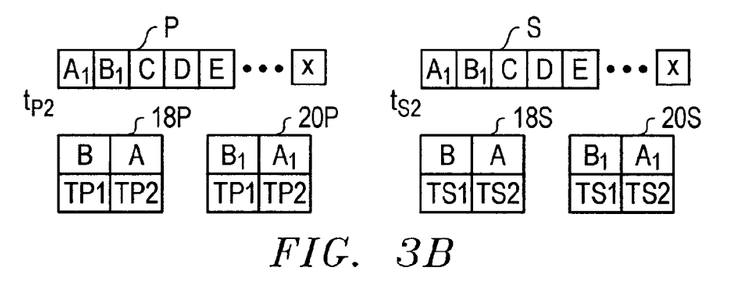

FIGS. 3a and 3b illustrate changes to the data contents of volume P, volume S, roll-back log 18P, roll-back log 18S, roll-forward log 20P, and roll-forward log 20S after server 12S generates first and second write transactions to overwrite existing data in volume P. For ease of explanation, it will be presumed that server 12S does not generate any write transactions after server 12P generates the first and second write transactions. With reference to FIG. 3a, server 12P, after time $t_0$, generates the first write data transaction to overwrite existing data (designated B) in block 2 of volume P with new data (designated $B_1$). Before existing data B of block 2 is overwritten in volume P, data B is copied to roll-back log 18P in accordance with step 42. The existing data B in block 2 of volume P is then overwritten with new data $B_1$. The new data $B_1$ is copied to roll-forward log 20P. Lastly, server 12P generates tag TP1 which is stored along with new data $B_1$ in roll-forward log 20P and with existing data B in roll-back log 18P. Tag TP1 includes the identification of the target block (e.g., block 2) of the first write transaction. Additionally, tag TP1 includes a time stamp set to time $t_{P1}$, the time when data B is overwritten in volume P.

New data $B_1$ is transmitted to data center 10S via data link 24. Before existing data B in block 2 of volume S is overwritten in accordance with step 56, data B is copied to roll-back log 18S in accordance with step 54 of FIG. 2a. The new data $B_1$ received from data center 10P, is copied to roll-forward log 20S. Server 12P generates a tag TS1 which it stores along with new data $B_1$ in roll-forward log 20S and with existing data B in roll-back log 18P. Tag TS1 includes the identification of the target block (e.g., block 2) in volume S. Additionally, tag TS1 includes a time stamp set to time $t_{S1}$, the time when data B was overwritten in volume S. FIG. 3a shows the data state of volume V, volume S, log 18P, log 18S, log 20S, and log 20P after completion of the process steps after time $t_{S1}$. FIG. 3a shows that volume P is data consistent with volume S at time $t_{S1}$.

After server 12P generates the first write transaction, server 12P generates the second write transaction to overwrite existing data (designated A) in block 1 of volume P with new data (designated $B_1$). Before existing data A of block 1 is overwritten in volume P, data A is copied to roll-back log 18P in accordance with step 42. The existing data A in block 1 of volume P is then overwritten with new data $A_1$. The new data $A_1$ is copied to roll-forward log 20P. Lastly, server 12P generates tag TP2 which is stored along with new data $A_1$ in roll-forward log 20P and with existing data A in roll-back log 18P. Tag TP2 includes the identification of the target block (e.g., block 1) of the second write transaction. Additionally, tag TP2 includes a time stamp set to time $t_{P2}$, the time when data A is overwritten in volume P.

New data $A_1$ is transmitted to data center 10S via data link 24. Before existing data A in block 1 of volume S is overwritten in accordance with step 56, data A is copied to roll-back log 18S in accordance with step 54 of FIG. 2a. New data $A_1$ received from data center 10P, is copied to roll-forward log 20S. Server 12P generates a tag TS2 which it stores along with new data $A_1$ in roll-forward log 20S and with existing data A in roll-back log 18P. Tag TS2 includes the identification of the target block (e.g., block 1) in volume S. Additionally, tag TS2 includes a time stamp set to time $t_{S2}$, the time when data A was overwritten in volume S. FIG. 3b shows the data state of volume V, volume S, log 18P, log 18S, log 20S, and log 20P after completion of the process steps after time $t_{S2}$.

FIG. 3b shows that volume P is data consistent with volume S at time $t_{S2}$. As can be seen in FIGS. 3a and 3b, the process shown within FIG. 2a operates to maintain data consistency between volume P and volume S. Steps 54-62 are performed in data center 10S in response to data center 10S receiving new data from data center 10P in step 52. It is possible, however, that data link 24 between data centers 10P and 10S may fail. As a result, new data transmitted by data center 10P will not be received by data center 10S after existing data in volume P is overwritten. When this happens, steps 54-62 will not be performed, and volume S will be data inconsistent with volume P. To illustrate, presume data link 24 fails sometime after time $t_{S2}$, the time data A is overwritten with new data $A_1$ in volume S. Moreover, presume that server 12P generates third and fourth write transactions after failure of the data link 24. More particularly, the third write transaction is generated to overwrite existing data (designated D) in block 4 of volume P with new data (designated $D_1$). Before existing data D of block 4 is overwritten, data D is copied to roll-back log 18P in accordance with step 42. The existing data D in block 4 of volume P is then overwritten with new data $D_1$. New data $D_1$ is copied to roll-forward log 20P in accordance with step 46. Server 12P generates a tag TP3 which is stored along with new data $D_1$ in roll-forward log 20S and along with existing data D in roll-back log 18P. Tag TP3 includes the identification of the target block (e.g., block 4) of the third write transaction. Additionally, tag TP3 includes a time stamp set to time $t_{P3}$, the time when data D is overwritten in volume P.

Figure 3C:
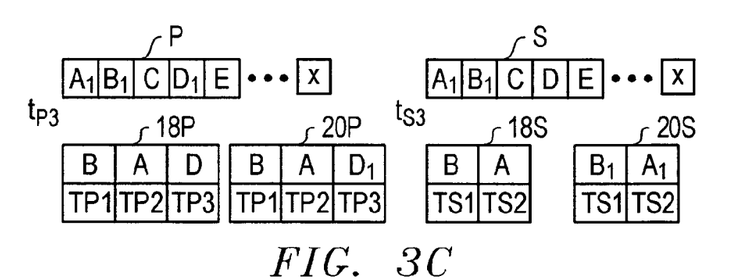
FIGS. 3c and 3d illustrate the data state of data volume P, volume S, the roll-back logs, and roll-forward logs after performing the process steps shown in FIG. 2a and after failure of the data link between the data centers of FIG. 1.

Because data link 24 has failed, new data $D_1$ along with a target block ID cannot be transmitted to data center 10S. Accordingly, data D in block 4 of volume S will not be overwritten with new data $D_1$, and the contents of logs 18S and 20S will remain unchanged as shown in FIG. 3c.

After server 12 generates the third write transaction, server 12P generates a fourth write transaction to overwrite existing data (designed $B_1$) in block 2 of volume P with new data (designated $B_2$). Before existing data $B_1$ of block 2 is overwritten, data $B_1$ is copied to roll-back log 18P in accordance with step 42. The existing data $B_1$ in block 4 of volume P is then overwritten with new data $B_2$. New data $B_2$ is copied to roll-forward log 20P in accordance with step 46. Server 12P generates a tag TP4 which is stored along with new data $B_2$ in roll-forward log 20S and along with existing data $B_1$ copied to roll-back log 18P. Tag TP4 includes the identification of the target block (e.g., block 2) of the fourth write transaction. Additionally, tag TP4 includes a time stamp set to time $t_{P4}$, the time when data $B_1$ is overwritten in volume P. Again, because data link 24 has failed, new data $B_2$ along with a target block ID cannot be transmitted to data center 10S. Accordingly, existing data $B_1$ in block 2 of volume S will not be overwritten with new data $B_2$, and the contents of logs 18S and 20S will remain unchanged as shown in FIG. 3d.

Figure 3D:
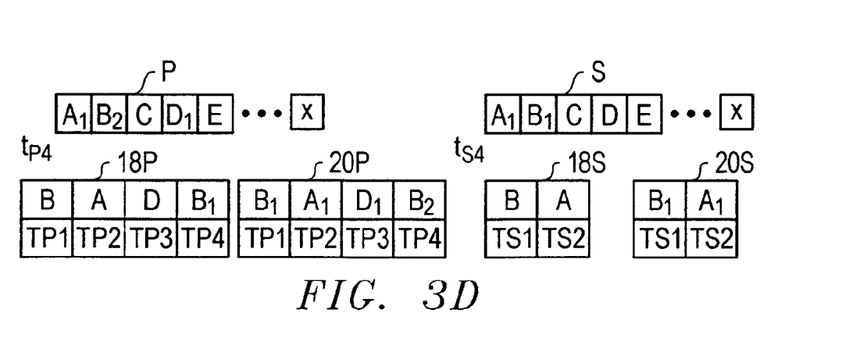
Figure 4:
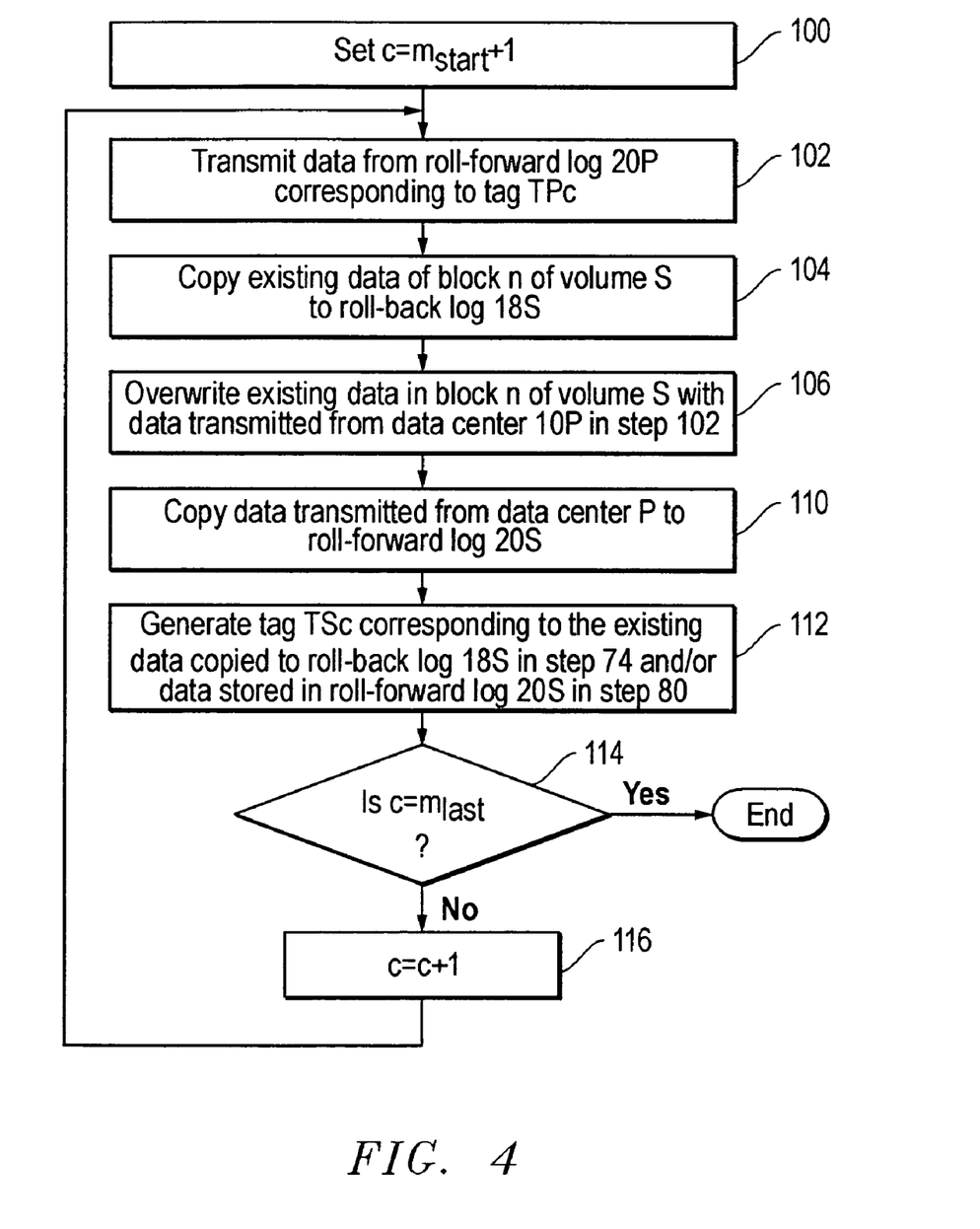
FIG. 4 illustrate operational aspects of restoring volume S to the data state of volume P after reestablishment of the data link between the data centers of FIG. 1.

FIG. 3d shows that data volume P and volume S are data inconsistent with each other. More particularly, the data in blocks 2 and 4 in volume P do not equate with the data in blocks 2 and 4, respectively, of volume S. However, once data link 24 is reestablished between data center 10P and data center 10S, the data contents of roll-forward log 20P can be used to bring volume S into data consistency with volume P. FIG. 4 illustrates operational aspects of incrementally updating volume S in write fidelity order until volume S is data consistent with copy P. It is noted that the process shown in FIG. 4 is just one of many that can be used to bring volume S into data consistency with volume P after data link 24 is reestablished.

The process shown in FIG. 4 begins when a dummy variable c is set to $m_{start}+1$ in step 100, where $m_{start}$ is the tag number of the tag corresponding to the last data block successfully transmitted to data center 10S before link 24 failed. In another embodiment, $m_{start}$ is the tag number of the tag corresponding to any data block successfully transmitted to data center 10S before failure of link 24. In the illustrated example, $m_{start}$ equals 2 since tag TP2 corresponds to data A, the last data block successfully transmitted to data center 10s in step 52. In step 102, data center 10P transmits data from roll-forward log 20P corresponding to tag TPc. It is noted that the block number n contained within tag TPc is transmitted along with the corresponding data in step 102. In one embodiment, the entire tag TPc may be transmitted in step 102 along with the corresponding data from log 20P. Once the transmitted data is received in data center 10S, existing data of block n in volume S is copied to roll-back log 18S as shown in step 104. The existing data in block n of volume S is then overwritten with the data transmitted from data center 10P as shown in step 106. In step 110, the data transmitted from data center P is copied into roll-forward log 20S. It is noted that step 110 may occur before step 104 and/or step 106. In step 112, tag TSc is generated. Tag TSc corresponds to the existing data copied to roll-back log 18S in step 104 and/or data stored in roll-forward log 20S in step 110. Tag TSc is stored with existing data copied to roll-back log 18S in step 104 and/or data stored in roll-forward log 20S in step 110. In step 114, server 12S compares the current value of c with $m_{last}$, where $m_{last}$ is the tag number of the last tag TP$m_{last}$ generated within data center 10P. It is noted that while volume S is being brought into data consistency with volume P, server 12P may generate new transactions for writing new data to volume P. As such, the value of $m_{last}$ may change before the process in FIG. 4 ends. It will be presumed that no new write transactions are generated after generation of the fourth write transaction. Accordingly, $m_{last}$ equals 4 in the illustrated example. If c and $m_{last}$ are unequal to each other, then c is incremented by 1 and steps 102-114 are repeated. When c equals $m_{last}$, the process ends, and volume P should be data consistent with volume S. When volume S is brought into data consistency with volume P (i.e. when volume S has been updated with data in roll-forward log 20p corresponding to the last generated tag TP$m_{last}$), the process shown within FIG. 2a can be resumed.

Figure 5A:
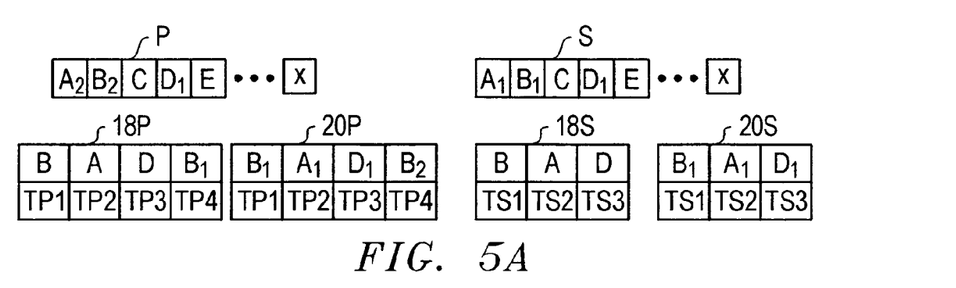
FIGS. 5a and 5b illustrate the data state of data volume P, volume S, the roll-back logs, and roll-forward logs after performing process steps shown in FIG. 4.
Figure 5B:
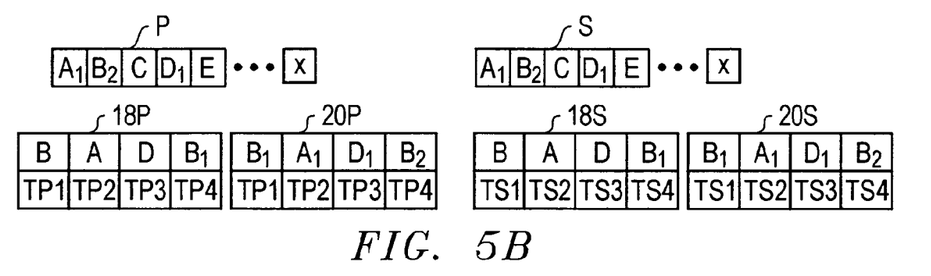

FIGS. 5a and 5b illustrate changes to the data contents of volume S, roll-back log 18S, and roll-forward log 20S in response to implementing the process shown in FIG. 4. After the data link 24 has been reestablished, server 12P sets c to 3 the value of $m_{last}+1$. Thereafter, server 12P accesses tag TP3 to learn that data $D_1$ in log 20P corresponds to tag TP3. Server 12P transmits a copy of data $D_1$ along with the block identity (e.g., block 4) of tag TP3 to data center 10S via data link 24. Server 12S, in turn, copies the existing data D of block 4 of volume S to roll-back log 18S in accordance with step 104. The existing data D in block 4 of volume S is overwritten with data $D_1$ transmitted from data center 10P. Data $D_1$ is copied to roll-forward log 20S in accordance with step 110. Tag TS3 is subsequently generated in step 112. Tag TS3 corresponds to data $D_1$ copied to roll-back log 18S and data $D_1$ stored in roll-forward log 20S. Tag TS3 is stored with data D in roll-back log 18S and data $D_1$ stored in roll-forward log 20S. FIG. 5a represents the data states of volume S, log 18S, and log 20S after volume S has been updated with new data $D_1$.

With c=3, c is then compared to 4, the value of $m_{last}$. Because the current value of c does not equate with 4, c is incremented to 4 and steps 102-114 are repeated. With c set to 4, server 12P accesses tag TP4 to learn that data $B_2$ in log 20P corresponds to tag TP4. Server 12P transmits a copy of data $B_2$ along with the block identity (e.g., block 2) of tag TP4 to data center 10S via data link 24. Server 12S, in turn, copies the existing data $B_1$ of block 2 in volume S to roll-back log 18S in accordance with step 104. The existing data $B_1$ in block 4 of volume S is overwritten with data $B_2$ transmitted from data center 10P. Data $B_2$ is copied to roll-forward log 20S in accordance with step 110. Tag TS4 is subsequently generated in step 112. Tag TS4 corresponds to data $B_1$ copied to roll-back log 18S and data $B_2$ stored in roll-forward log 20S. Tag TS4 is stored with data $B_1$ in roll-back log 18S and data $B_2$ stored in roll-forward log 20S. FIG. 5b represents the data states of volume S, log 18S, and log 20S after volume S has been updated with new data $B_2$.

With c=4, c is then compared to 4, the value of $m_{last}$. Because the current value of c equals 4 the process of FIG. 4 ends, and volume S is data consistent with volume P. Further, the data block contents of logs 18P and 20P are consistent with the data block contents of logs 18S and 20S, respectively. It is noted that during the process shown within FIG. 4, link 24 may once again fail before volume S has been brought into full data consistency with volume P. In this event, the process shown in FIG. 4 can be restarted, although $m_{start}$ will have a different value. Further, it is noted that a process similar to that shown in FIG. 4 can be applied to bring volume P in data consistency with volume S after failure and restoration of link 24 when only volume S has been modified after failure and restoration of link 24.

The examples provided in FIGS. 3a-3d and FIGS. 5a and 5b presume that server 12S does not generate write transactions for writing new data to volume S. As described above, the process described in FIG. 2b is implemented when server 12S generates transactions for overwriting existing data in volume V with new data. The processes of FIGS. 2a and 2b can operate simultaneously when both servers 12P and 12S generate transactions to overwrite data in volumes P and S, respectively. However, at some point during simultaneous operation of these processes, data link 24 may fail. When link 24 does fail, steps 54-62 of FIG. 2a are not performed after volume P is modified in accordance with a write transaction generated by server 12P, and steps 84-92 of FIG. 2b are not performed after volume S is modified in accordance with a write transaction generated by server 12S. A failure of link 24 before servers 12P and 12S generate respective write transactions will lead to data inconsistency between volumes P and S. In this situation, volumes P and S occupy a "split brain" data state.

Figure 6A:
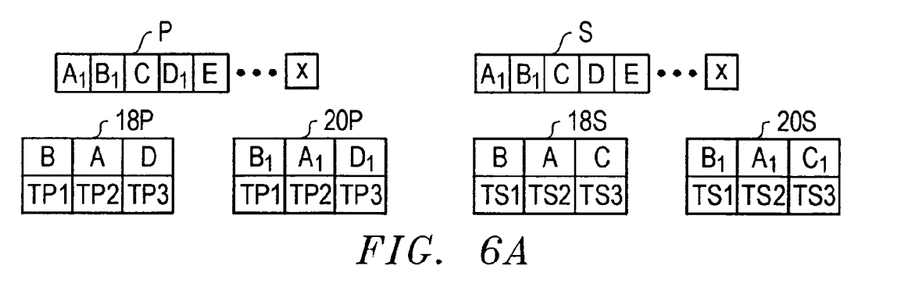
FIGS. 6a and 6b illustrate the data state of data volume P, volume S, the roll-back logs, and roll-forward logs after performing process steps shown in FIGS. 2a and 2b and after failure of the data link between the data centers of FIG. 1.

To illustrate, presume that data link 24 fails after time $t_{S2}$ (see FIG. 3b), and that server 12P subsequently generates third and fourth write transactions for overwriting existing data D and data $B_1$, respectively, in volume P with new data $D_1$ and $B_2$, respectively. Further presume that server 12S generates fifth and sixth transactions for overwriting data C and data $A_1$, respectively, in volume S with new data $C_1$ and $A_2$, respectively, after failure of data link 24. In response to generation of the third transaction, existing data D in block 4 of volume P is copied to roll-forward log 18P in accordance in accordance with step 42 of FIG. 2a. Data D in block 4 of volume P is overwritten with new data $D_1$ in accordance with step 44 of FIG. 2a. New data $D_1$ is stored in roll-forward log 20P in accordance with step 46 of FIG. 2a. Tag TP3 is generated and stored in logs 18P and 20P in accordance with step 50 of FIG. 2a. However, since link 24 has failed, new data $D_1$ cannot be transmitted to data center 10S in accordance with step 42 of FIG. 2a. As a result volume S is not updated with new data $D_1$. Presume server 12S generates the fifth transaction at the same time server 12P generates the third transaction. In response to generation of the fifth transaction, existing data C in block 3 of volume S is copied to roll-forward log 18S in accordance in accordance with step 72 of FIG. 2b. Data C in block 3 of volume S is overwritten with new data $C_1$ in accordance with step 74 of FIG. 2b. New data $C_1$ is stored in roll-forward log 20S in accordance with step 76 of FIG. 2b. Tag TS3 is generated and stored in logs 18S and 20S in accordance with step 80 of FIG. 2b. However, since link 24 has failed new data $C_1$ cannot be transmitted to data center 10P in accordance with step 82 of FIG. 2b. As a result volume P is not updated with new data $C_1$. FIG. 6a shows the data states of volumes and the logs after generation of the third and fifth write transactions.

Figure 6B:
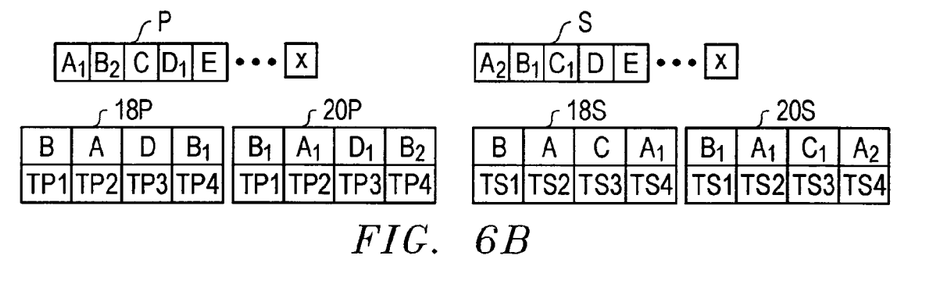

In response to generation of the forth transaction, existing data $B_2$ in block 2 of volume P is copied to roll-forward log 18P in accordance in accordance with step 42 of FIG. 2a. Existing data $B_1$ in block 4 of volume P is overwritten with new data $D_1$ in accordance with step 44 of FIG. 2a. New data $B_2$ is stored in roll-forward log 20P in accordance with step 46 of FIG. 2a. Tag TP4 is generated and stored in logs 18P and 20P in accordance with step 50 of FIG. 2a. New data $B_2$ cannot be transmitted to data center 10S in accordance with step 42 of FIG. 2a since link 24 has failed. As a result volume S is not updated with new data $B_2$. Presume server 12S generates the sixth transaction at the same time server 12P generates the fourth transaction. In response to generation of the sixth transaction, existing data $A_I$ in block 1 of volume S is copied to roll-forward log 18S in accordance in accordance with step 72 of FIG. 2b. Data $A_1$ in block 1 of volume S is overwritten with new data $A_2$ in accordance with step 74 of FIG. 2b. New data $A_2$ is stored in roll-forward log 20S in accordance with step 76 of FIG. 2b. Tag TS4 is generated and stored in logs 18S and 20S in accordance with step 80 of FIG. 2b. However, since link 24 has failed, new data $A_2$ cannot be transmitted to data center 10P in accordance with step 82 of FIG. 2b. As a result volume P is not updated with new data $A_2$. FIG. 6b shows the data states of volumes and the logs after generation of the fourth and sixth write transactions.

Figure 7:
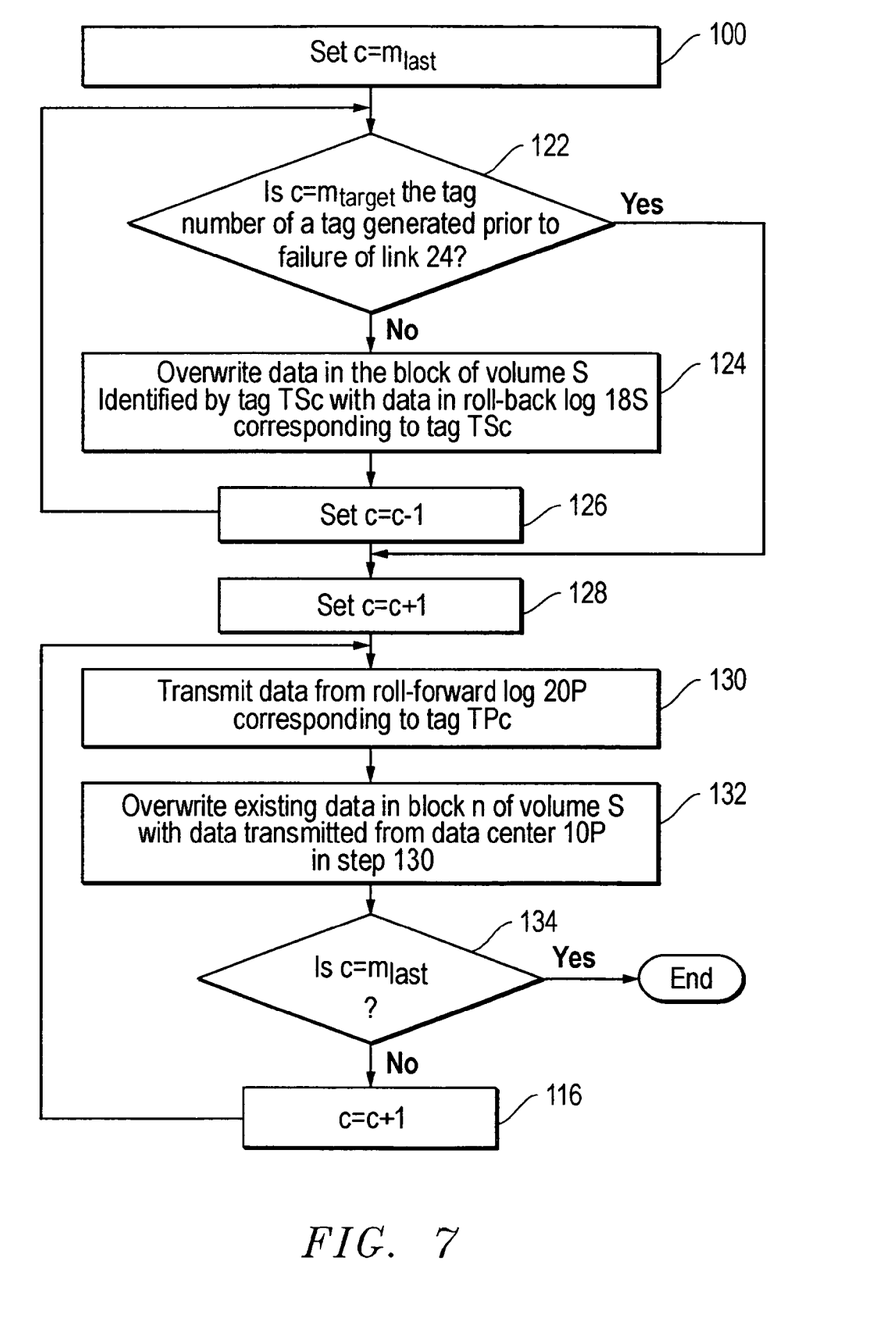
FIG. 7 illustrate operational aspects of restoring volume S to the data state of volume P after reestablishment of the data link between the data centers of FIG. 1.

FIG. 6b shows that volumes P and S are data inconsistent with each other. More particularly, data in blocks 1-4 of volume P do not equal data in blocks 1-4, respectively, of volume S. However the contents of roll-back log 18S and roll-forward log 20P can be applied to volume S in order to bring volume S into data consistency with volume P, or the contents of roll-back log 18P and roll-forward log 20S can be applied to volume P in order to bring volume P into data consistency with volume S. FIG. 7 illustrates operational aspects of applying the contents of roll-back log 18S and roll-forward log 20P to volume S in order to bring volume S into data consistency with volume P. It should be noted that the contents of roll-back log 18P and roll-forward log 20S to volume P in a manner substantially similar to that shown in FIG. 7 in order to bring volume P into data consistency with volume S.

FIG. 7's process is implemented in two parts. The first part includes incrementally restoring volume S in reverse chronological order using the contents of roll-back log 18S until volume S is in the data state it occupied prior to the instant in time when data link 24 failed. In the second part, volume S is then updated in forward chronological order using the contents of roll-forward log 20P until volume S and volume P are data consistent. The process of FIG. 7 begins when dummy variable c is set to $m_{last}$, where $m_{last}$ is the tag number of the last tag generated and stored within logs 18S and/or 20S. In the illustrated example, $m_{last}$ equals 4 since as shown in FIG. 6b, tag TS4 is the last tag generated prior to initiation of the process of FIG. 7. In step 122, the value of c is compared to $m_{target}$, where $m_{target}$ is the tag number of a tag stored in log 18S and/or 20S prior to failure of link 24. In the illustrated example, $m_{target}$ can be either 1 or 2, since tags TS1 and TS2 were stored in logs 18S and 18P prior to failure of link 24. Thereafter, in step 124 data in the block of volume S identified by tag TSC is overwritten with data from roll-back log 18S corresponding to tag TSc. In step 126, variable c is decremented, and c is once again compared to $m_{target}$. Steps 124 and 126 are repeated until the value of c equates with $m_{target}$. When c equates with $m_{target}$, volume S has been incrementally restored in reverse chronological order to the data state it occupied prior to failure of link 24.

Figure 8A:
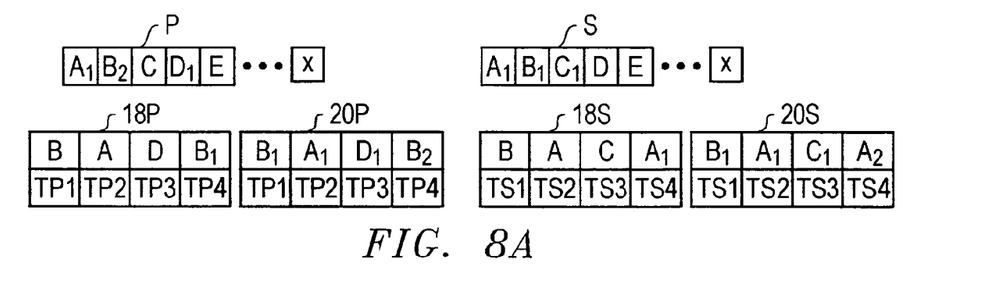
FIGS. 8a-8d illustrates the data state of data volume P, volume S, the roll-back logs, and roll-forward logs after performing the process steps shown in FIG. 7.
Figure 8B:
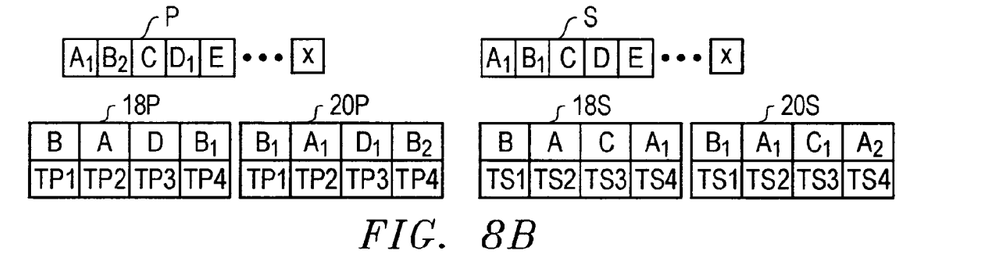

FIGS. 8a and 8b illustrate changes to the data contents of volume S in response to implementing steps 120-126 of FIG. 7. In particular, after the data link 24 has been reestablished, server 12S sets variable c to 4, the value of $m_{last}$, in accordance with step 120. Thereafter, server 12S accesses tag TS4 to learn that data $A_1$ in log 18S corresponds to tag TS4. Tag TS4 also indicates that data $A_1$ was copied from block 1 of volume S. Server 12S overwrites existing data $A_2$ in block 1 of volume S with data $A_1$ corresponding to tag TS4 in accordance with step 124. FIG. 8a shows the state of volume S after existing data $A_2$ in block 1 is overwritten with data $A_1$. C is subsequently decremented in accordance with step 126 so that c equals 3. With c equal to 3, c is compared to 2, the value of $m_{last}$ in accordance with step 120. Because the current value of c does not equate with $m_{last}$, server 12S overwrites existing data $C_1$ in volume S with a copy of data C stored of log 18S in accordance with step 124 since data C in log 18S corresponds to tag TS3, and since tag TS3 identifies that data C in log 18S was copied from block 3 of volume S. FIG. 8b represents the data state of volume S after data in block 3 of volume S is overwritten with $A_1$ in accordance with step 124. C is again decremented in accordance with step 126 and compared with $m_{target}$ in accordance with step 122. Since dummy variable c equals 2, c is equal to $m_{target}$. Accordingly, volume S has been incrementally restored in reverse chronological order to the data state it occupied prior to failure of link 24.

The process of FIG. 7 also includes updating volume S in forward chronological order according to the contents of roll-forward log 20P until the data state of volume S equals the data state of volume P. This part of the process of FIG. 7 begins after step 122 when, in step 128, dummy variable c is incremented by 1. In step 130, data from roll-forward log 20P corresponding to tag TPc, is transmitted to data center 10S via data link 24. Once data center 10S receives this transmitted data, server 12S overwrites existing data in volume S with the data transmitted from data center 10P. It is noted that the target block number n of tag TPc may be transmitted along with the data in step 130. Thereafter, in step 134, variable c is compared to $m_{last}$. If these values are not equal to each other, variable c is incremented by one and steps 130-134 are repeated. Eventually, c will equal $m_{last}$, and the process shown within FIG. 7 ends. When the process shown within FIG. 7 ends, volume S will be data consistent with volume P. As an aside, when data consistency is achieved between volumes P and S, the data of logs 18S, 20S, 18P and 20P corresponding to tags $TSm_{last}$ and $TPm_{last}$, inclusive, may be erased or otherwise invalidated. Tags stored in logs 18S, 20S, 18P and 20P prior to and including tags $TSm_{last}$ and $TPm_{last}$ may also be erased or otherwise invalidated.

Figure 8C:
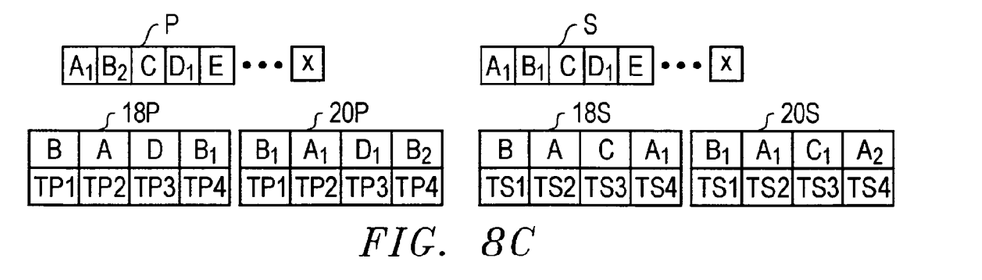
Figure 8D:
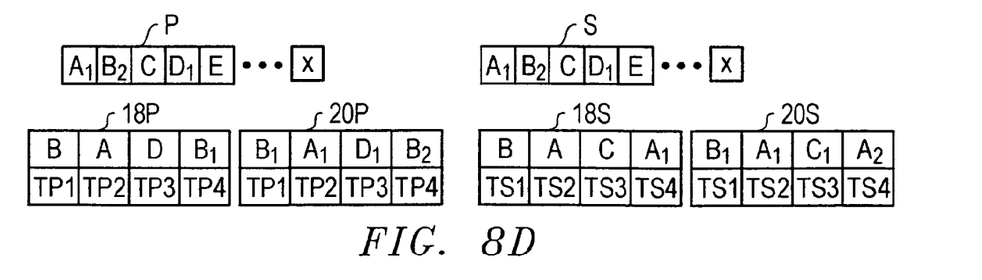

FIGS. 8c and 8d illustrate changes to the data contents of volume S in response to implementing process steps 128-136 of FIG. 7. C was set to 2 when the first part of the process in FIG. 7 (i.e, process steps 120-126) ended. C is incremented by 1 to 3 in accordance with step 128. Thereafter, data $D_1$ corresponding to tag TP3 is transmitted from roll-forward log 20P in accordance with step 130. Data center 105 receives data $D_1$ from data center 10P. Server 12S overwrites existing data D in block 4 of volume S with data $D_1$ transmitted from data center 10P in accordance with step 132. Three (3), the value of c, is then compared to 4, the value of $m_{last}$ in accordance with step 134. Since these two values are unequal, c is incremented to 4 in accordance with step 136. Thereafter, steps 130-134 are repeated with c set to 4. Server 12S accesses tag TP4 in roll-forward log 20P and learns that data $B_2$ corresponds thereto. Tag TP4 also indicates that data $B_2$ was copied to log 20P from block 2 of volume P. In accordance with step 130 of FIG. 7, data center 10P transmits data $B_2$ from roll-forward log 20P to data center 10S via data link 24. The identity of the target block (block 2) contained within tag TP4 may also be transmitted along with data $B_2$. Data $B_1$ in block 2 of volume S is then overwritten with data $B_2$ transmitted from data center 10P in accordance with step 132. Four (4) the current value of C, is then compared with 4, value of $m_{last}$, in accordance with step 34. Given that these two values are equal, the process defined by steps 128-136 in FIG. 7 ends. FIG. 8d represents the data state of volume S after volume S has been updated with data $B_2$. FIG. 8d also shows that volume P and volume S are data consistent. At this point, tags TP1-TP4 and TS1-TS4 may be deleted from logs shown in FIG. 8d along with their corresponding data stored therein. Although not shown, the process shown in FIG. 7 may occur while new write transactions are generated by server 12P and/or server 12S.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:
1. A method comprising:
    creating first and second data volumes, wherein the second data volume is data consistent with the first data volume at time $t_0$;
    writing new first data to the first data volume at time $t_1$, wherein $t_1$ is after time $t_0$;
    writing new second data to the first data volume at time $t_2$, wherein $t_2$ is after time $t_1$;
    writing new third data to the second data volume at time $t_3$, wherein $t_3$ is after time $t_0$, wherein the second data vol- ume is in a first data state before the new third data is written to the second data volume, wherein the second data volume is in a second data state after the new third data is written to the second data volume, and wherein the new third data is different from the new first data and the new second data;

writing new fourth data to the second data volume at time $t_4$, wherein $t_4$ is after time $t_3$, wherein the second data volume is in the second data state before the new fourth data is written to the second data volume, wherein the second data volume is in a third data state after the new fourth data is written to the second data volume, and wherein the new fourth data is different from the new first data, the new second data, and the new third data;

restoring the second data volume to the second data state at time $t_5$, wherein time $t_5$ is after time $t_4$;

restoring the second data volume to the first data state at time $t_6$, wherein time $t_6$ is after time $t_5$;

writing the new first data to the second data volume at time $t_7$, wherein $t_7$ is after time $t_6$;

writing the new second data to the second data volume at time $t_8$, wherein $t_8$ is after time $t_7$.

2. The method of claim 1 further comprising:
storing the new first data in a roll-forward memory;
storing the new second data in the roll-forward memory after the new first data is stored in the roll-forward memory.

3. The method of claim 1 wherein:
old third data of the second data volume is overwritten with the new third data at time $t_3$;
old fourth data of the second data volume is overwritten with new third data at time $t_4$.

4. The method of claim 3 further comprising:
storing a copy of the old third data in a roll-back memory;
storing a copy of the old fourth data in the roll-back memory after storing the copy of the old third data in the roll-back memory.

5. The method of claim 4 wherein restoring the second data volume to the second data state comprises overwriting the new fourth data in the second data volume with a copy of the old fourth data from the roll-back memory, and wherein restoring the second data volume to the first data state comprises overwriting the new third data in the second data volume with a copy of the old third data from the roll-back memory.

6. One or more computer readable memories for storing computer executable instructions, wherein a data processing system performs a method in response to executing the instructions, the method comprising:

creating first and second data volumes, wherein the second data volume is data consistent with the first data volume at time $t_0$;

writing new first data to the first data volume at time $t_1$, wherein $t_1$ is after time $t_0$;

writing new second data to the first data volume at time $t_2$, wherein $t_2$ is after time $t_1$;

writing new third data to the second data volume at time $t_3$, wherein $t_3$ is after time $t_0$, wherein the second data volume is in a first data state before the new third data is written to the second data volume, wherein the second data volume is in a second data state after the new third data is written to the second data volume, and wherein the new third data is different from the new first data and the new second data;

writing new fourth data to the second data volume at time $t_4$, wherein $t_4$ is after time $t_3$, wherein the second data volume is in the second data state before the new fourth data is written to the second data volume, wherein the second data volume is in a third data state after the new fourth data is written to the second data volume, and wherein the new fourth data is different from the new first data, the new second data, and the new third data;

restoring the second data volume to the second data state at time $t_5$, wherein time $t_5$ is after time $t_4$;

restoring the second data volume to the first data state at time $t_6$, wherein time $t_6$ is after time $t_5$;

writing the new first data to the second data volume at time $t_7$, wherein $t_7$ is after time $t_6$;

writing the new second data to the second data volume at time $t_8$, wherein $t_8$ is after time $t_7$.

7. The one or more computer readable media of claim 6 wherein the method further comprises:
storing the new first data in a roll-forward memory;
storing the new second data in the roll-forward memory after the new first data is stored in the roll-forward memory.

8. The one or more computer readable media of claim 6 wherein:
old third data of the second data volume is overwritten with the new third data at time $t_3$;
old fourth data of the second data volume is overwritten with new third data at time $t_4$.

9. The one or more computer readable media of claim 8 wherein the method further comprises:
storing a copy of the old third data in a roll-back memory;
storing a copy of the old fourth data in the roll-back memory after storing the copy of the old third data in the roll-back memory.

10. The one or more computer readable media of claim 9 wherein restoring the second data volume to the second data state comprises overwriting the new fourth data in the second data volume with a copy of the old fourth data from the roll-back memory, and wherein restoring the second data volume to the first data state comprises overwriting the new third data in the second data volume with a copy of the old third data from the roll-back memory.

11. An apparatus comprising:
a first memory system configured to store a first data volume;
a second memory system configured to store a second data volume that is data consistent with the first data volume at time $t_0$;
a first computer system in data communication with the first memory system, wherein the first computer system comprises a first memory medium that stores first instructions, wherein the computer system performs a first method in response to executing the first instructions, the first method comprising:
writing new first data to the first data volume at time $t_1$, wherein $t_1$ is after time $t_0$;
writing new second data to the first data volume at time $t_2$, wherein $t_2$ is after time $t_1$;
a second computer system in data communication with the second memory system and the first computer system, wherein the second computer system comprises a second memory for storing second instructions, wherein the second computer system performs a second method in response to executing the second instructions, the second method comprising:
writing new third data to the second data volume at time $t_3$, wherein $t_3$ is after time $t_0$, wherein the second data volume is in a first data state before the new third data is written to the second data volume, wherein the second data volume is in a second data state after the new third data is written to the second data volume, and wherein the new third data is different from the new first data and the new second data;

writing new fourth data to the second data volume at time $t_4$, wherein $t_4$ is after time $t_3$, wherein the second data volume is in the second data state before the new fourth data is written to the second data volume, wherein the second data volume is in a third data state after the new fourth data is written to the second data volume, and wherein the new fourth data is different from the new first data, the new second data, and the new third data;

restoring the second data volume to the second data state at time $t_5$, wherein time $t_5$ is after time $t_4$;

restoring the second data volume to the first data state at time $t_6$, wherein time $t_6$ is after time $t_5$;

writing the new first data to the second data volume at time $t_7$, wherein $t_7$ is after time $t_6$;

writing the new second data to the second data volume at time $t_8$, wherein $t_8$ is after time $t_7$.

* * * * *